Jan. 17, 1956 — J. H. PROVINCE — 2,730,910
AIR ACTUATED CONTROL SYSTEM
Filed Oct. 25, 1954 — 5 Sheets-Sheet 1

INVENTOR.
J. H. Province
BY
Hudson & Young
ATTORNEYS

Jan. 17, 1956  J. H. PROVINCE  2,730,910
AIR ACTUATED CONTROL SYSTEM
Filed Oct. 25, 1954  5 Sheets-Sheet 2

INVENTOR.
J. H. Province
BY
Hudson & Young
ATTORNEYS

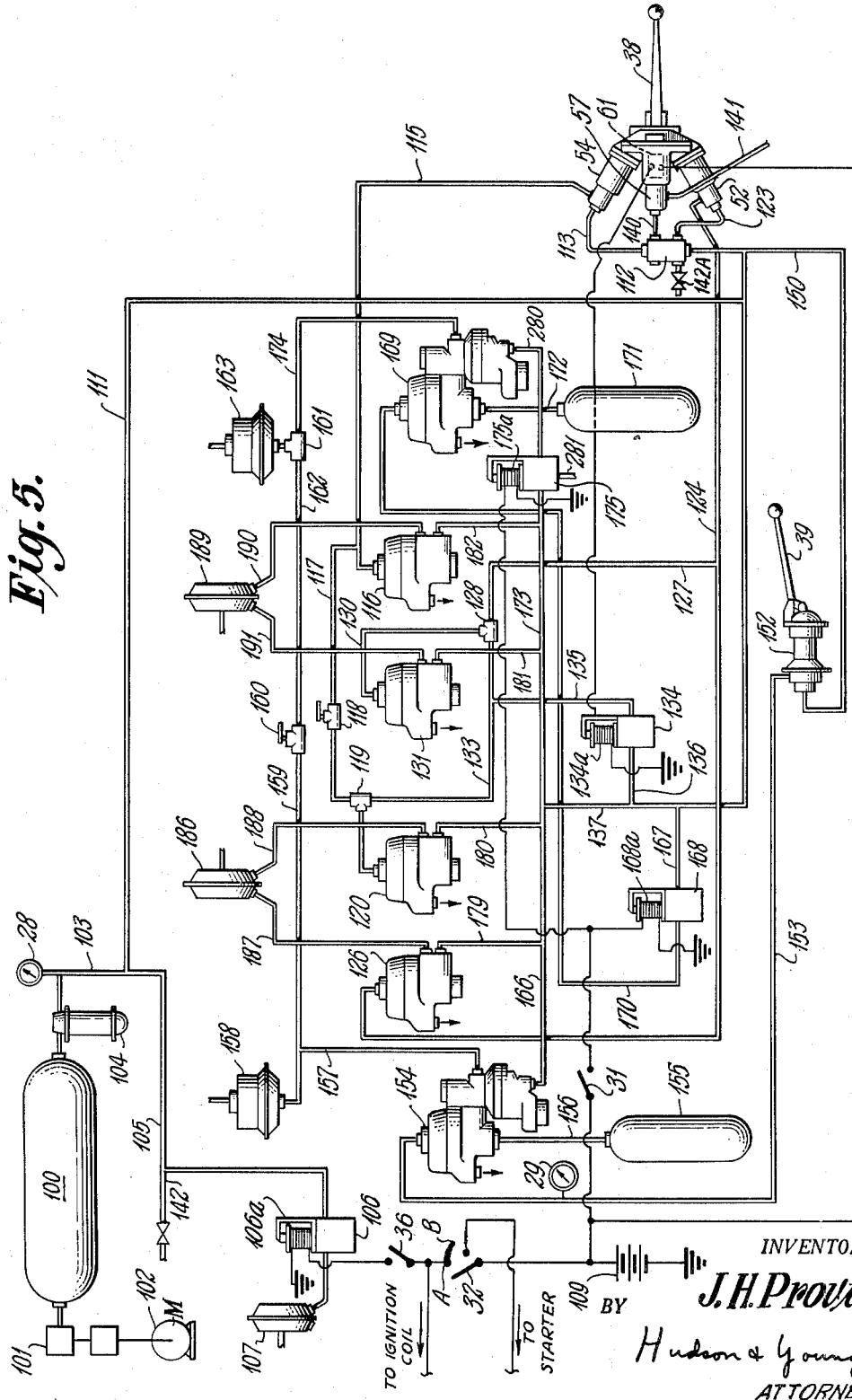

Jan. 17, 1956   J. H. PROVINCE   2,730,910
AIR ACTUATED CONTROL SYSTEM
Filed Oct. 25, 1954   5 Sheets-Sheet 4
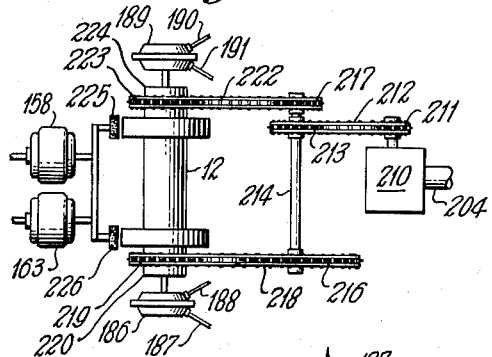
Fig. 6.
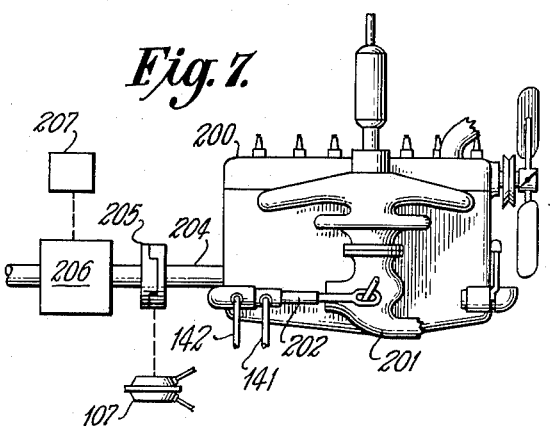
Fig. 7.
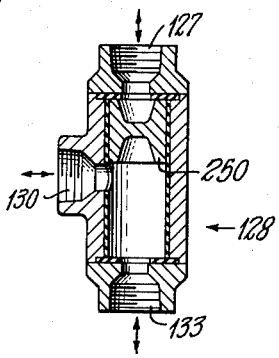
Fig. 9.
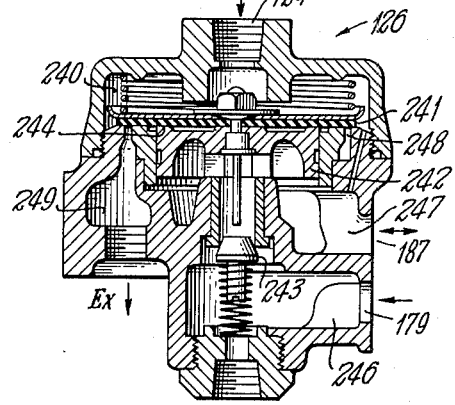
Fig. 8.
Fig. 10.
INVENTOR.
J. H. Province
BY
Hudson & Young
ATTORNEYS Jan. 17, 1956   J. H. PROVINCE   2,730,910
AIR ACTUATED CONTROL SYSTEM
Filed Oct. 25, 1954   5 Sheets-Sheet 5

INVENTOR.
J. H. Province
BY
Hudson & Young
ATTORNEYS

United States Patent Office 2,730,910
Patented Jan. 17, 1956

2,730,910

AIR ACTUATED CONTROL SYSTEM

John H. Province, Oklahoma City, Okla., assignor to Phillips Petroleum Company, a corporation of Delaware Application October 25, 1954, Serial No. 464,391

12 Claims. (Cl. 74—472)

This invention relates to a control system for well servicing, drilling or workover rigs. In one specific aspect, it relates to apparatus for operating a plurality of control devices by a single handle.

In servicing an oil well, the pulling and running of sucker rods, pumps and tubing is essentially the same whether the operation is performed with a truck equipped with a mast or whether the well is equipped with a derrick. A mobile power unit is set in position adjacent the well head and the derrick or mast is strung with the conventional traveling blocks, wire lines, links, elevators and the like. Such a unit may be of the type wherein the winch drum is driven by the engine which operates the unit or may be of the type wherein the winch drum is driven by a separate engine provided for that purpose. In both instances, the pulling unit operator drives the winch drum at the fastest possible speed that well load conditions permit. This operation is performed by the use of suitable transmission and clutch mechanism.

Once the necessary equipment is set up and the string of tubing is ready for pulling, the pulling unit operator starts the engine and selects a proper transmission speed, which depends on the load conditions. The pulling crew latches the elevators around the tubing string immediately below the top collar and the unit operator engages the low speed winch clutch to drive the winch drum. It is often possible that after the load is moving, a faster speed can be employed to lift the string. If so, the operator then disengages the low speed winch clutch and simultaneously engages the high speed winch clutch. When the desired number of joints of pipe has been lifted, the unit operator disengages the winch clutch and sets the brakes. The pulling crew sets the slips around the pipe and breaks the pipe joint. The derrick man then guides the pipe to its proper position in the derrick and immediately unlatches the elevators so that they can be lowered to repeat the operation.

The above operations have been controlled for the most part in the past by means of mechanical levers. Consequently, the operator must exert considerable physical effort to actuate the various devices controlled by these levers. Since the unit operator supervises all pulling operations, he must be alert to the entire field of operations. Since his position on the unit near the winch drum is fixed, the operator must stare upwardly into the sun during part of the operations. Also, since the distance from the operator's position to the well is short, he must bend his neck to follow the elevators up and down the derrick. These conditions all add to the physical strain imposed upon the operator and tend to reduce his efficiency and possibly render him careless.

In accordance with the present invention, there is provided an improved air actuated control system for use in oil well servicing, drilling and workover operations. This control system is housed in a portable box which can be located at any desired location about the rig. In this manner, the operator can select a position from which all of the control operations can be carried out in the most efficient manner. Apparatus is provided whereby four individual switching units can be engaged selectively, or in pairs, by means of a single manual control lever. This reduces the number of levers required and enables the unit operator to devote more of his attention to the servicing operation.

Accordingly, it is an object of this invention to provide a well servicing, drilling or workover control unit which can be placed at the most desirable position in relation to the well and power unit to ensure efficient and safe operation.

Another object is to provide novel apparatus to be actuated manually by the unit operator to effect the desired control of the winch drum power source and power transmission so that the winch drum can be operated at desired speeds.

A further object is to provide a control system for an oil well servicing, drilling or workover unit which enables the unit operator to reduce pulling time to a minimum by enabling him to select easily and quickly the fastest engine and transmission speed that load conditions will allow.

A still further object is to provide a pivoted control system whereby a single handle can actuate a plurality of control devices.

Other objects, advantages and features of this invention should become apparent from the following detailed description taken in conjunction with the accompanying drawings in which:

Figure 5 is a schematic view of the entire control system including the clutch mechanism, the brake mechanism and engine speed control mechanism;

Figure 6 is a schematic view of the clutch and brake mechanism associated with the winch drum;

Figure 7 is a schematic view of the truck engine and its drive shaft;

Figure 8 is a vertical central cross-sectional view of a relay valve used in the winch clutch actuating system;

Figure 9 is a vertical central cross-sectional view through a three-way check valve used in the system;

Figure 10 is a vertical central cross-sectional view through an emergency relay valve used in the system;

Figures 1, 2:
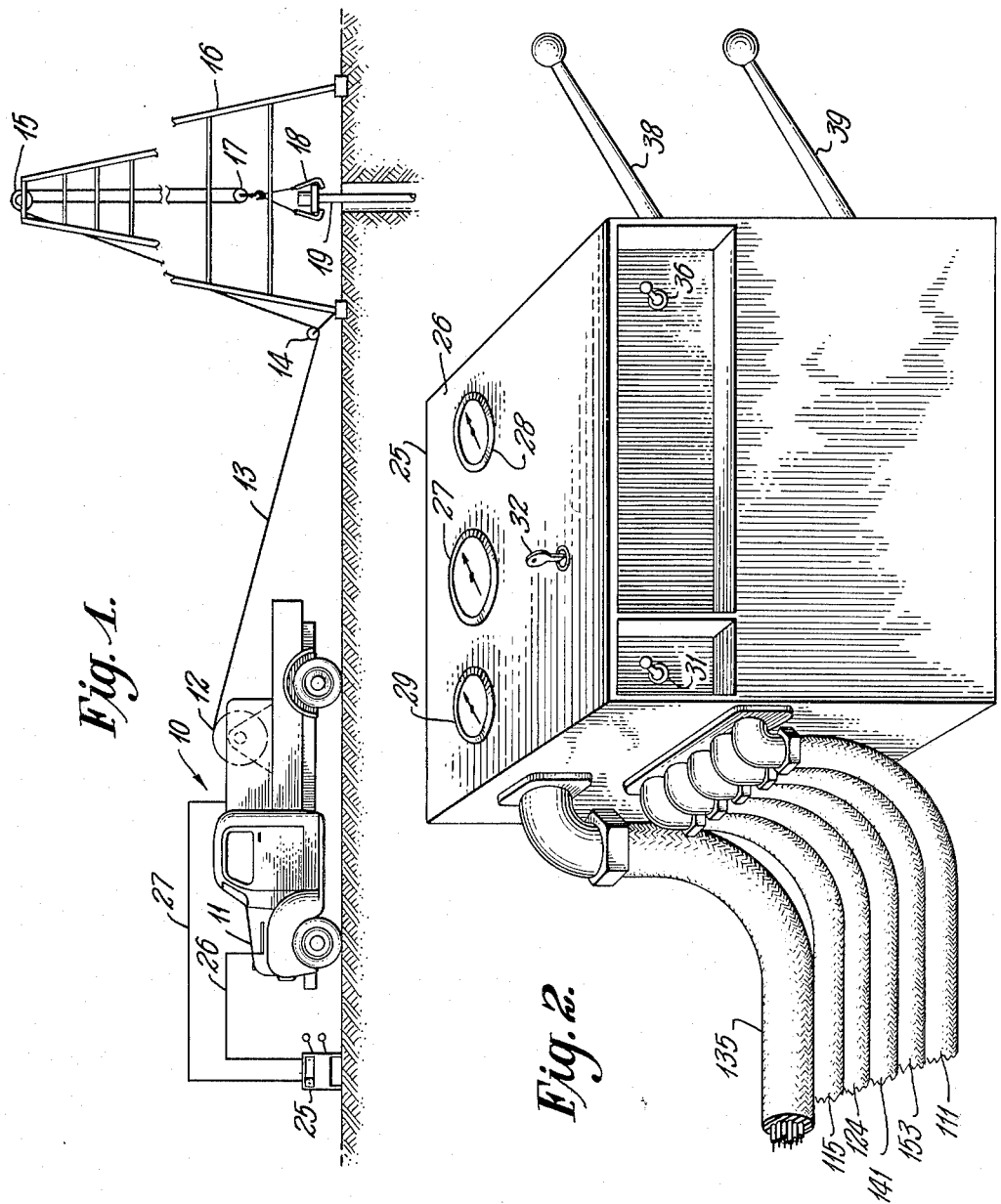
Figure 1 is a schematic representation of a mobile well servicing unit incorporating the control system of this invention.
Figure 2 is a view of the control unit housing.

Referring now to the drawing in detail, and to Figure 1 in particular, the mobile well servicing unit 10 comprises an engine driven vehicle 11 which has a winch drum 12 mounted thereon. A line 13 is reeled about drum 12 and extends therefrom under a hold-down pulley 14 and then over a crown pulley 15 mounted at the top of a derrick 16. From pulley 15, line 13 extends downwardly to a traveling block 17 and then upwardly to the top of derrick 16. Of course, line 13 can extend around pulley 15 and traveling block 17 several times, if desired. In this manner, the reeling and unreeling of line 13 on drum 12 results in traveling block 17 being raised and lowered through derrick 16. Traveling block 17 supports elevators 18 which grip tubing 19. A portable control box 25 is shown positioned in spaced relation with truck 11. Control box 25 is connected to the engine of truck 11 and to winch drum operating equipment, not shown in detail in Figure 1, by connecting lines 26 and 27, which include electrical and pneumatic lines, as described in detail hereinafter.

Control box 25 is illustrated in Figure 2. The top of box 25 includes a panel 26 which is provided with a tachometer 27 to indicate the speed of operation of the engine of truck 11 and pressure gages 28 and 29. The front of box 25 is provided with a recessed switch panel which houses a plurality of switches 31 and 36. These switches are described in detail hereinafter. One side of control box 25 is provided with a four-way manually operated lever 38 and a manually operated brake control lever 39. The second side of control box 25 has an electrical conduit 135, an air inlet conduit 111 and a plurality of outlet air conduits 115, 124, 141, 153 connected thereto.

Figure 4:
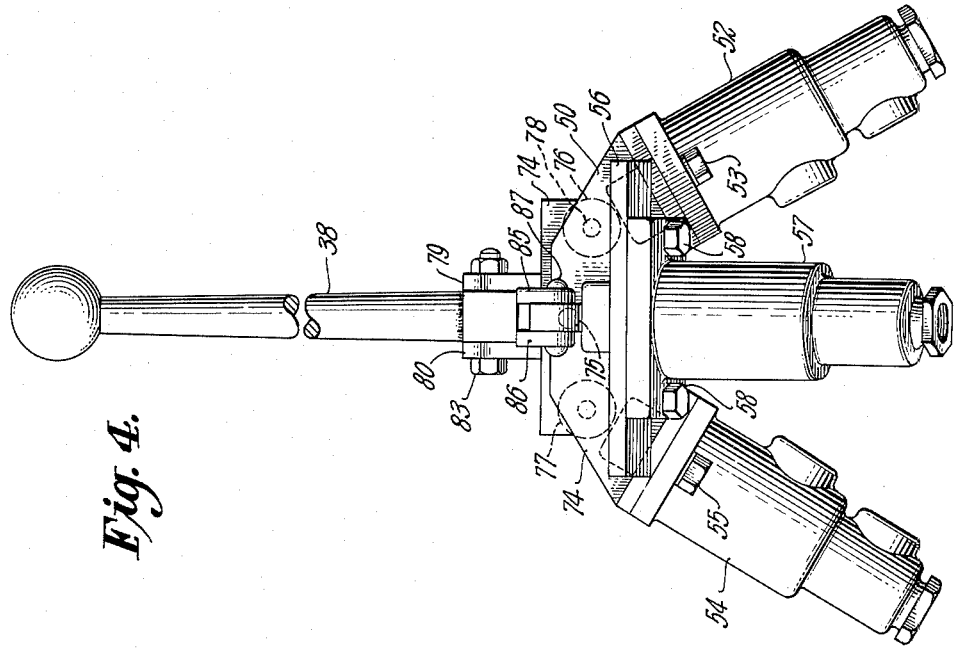
Figure 4 is a side view of the unit of Figure 3.
Figure 3:
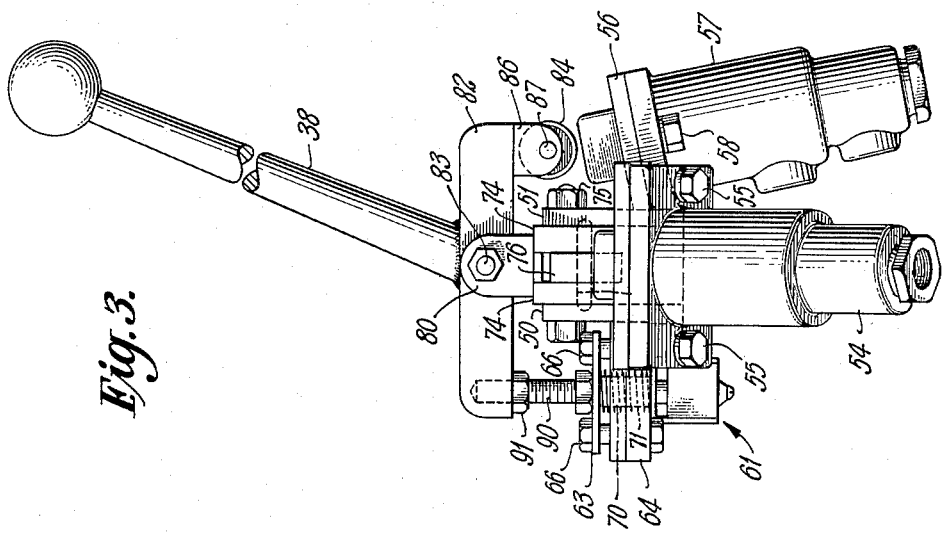
Figure 3 is a front elevation view of the lever operated switching unit.

The control mechanism associated with lever 38 is illustrated in detail in Figures 3 and 4. This mechanism is supported by a pair of frame plates 50 and 51 which are attached to the wall of control box 25. A first control valve 52 is attached to corresponding first ends of plates 50 and 51 by bolts 53 and a second control valve 54 is attached to corresponding second ends of plates 50 and 51 by bolts 55. A third frame plate 56 is attached to plates 50 and 51, and a throttle valve 57 is attached to frame plate 56 by bolts 58. An electrical switch 61 is attached to the opposite side of frame plate 56 by means of adapter plates 63 and 64 and bolts 66. Plate 63 is free to slide downwardly on bolts 66 to depress the operating button 70 of switch 61. A compression spring 71 normally retains adapter plate 63 in an up position so that the contacts in switch 61 are open.

A pair of cam levers 74 is pivotally mounted between frame plates 50 and 51 by a bolt 75. Cam rollers 76 and 77 are mounted on the opposite ends of cam levers 74 by pins 78 to engage respective control valves 52 and 54 when cam lever 74 is rotated clockwise and counterclockwise, respectively, about bolt 75 in Figure 4. A pair of spaced cam lever plates 79 and 80 is secured to the tops of cam levers 74. A handle lever 82 is pivotally mounted between cam lever plates 79 and 80 by a bolt 83. A cam roller 84 is suspended from one end of lever 82 between a pair of depending plates 85 and 86 by means of a pin 87. A bolt 90 is threaded into the second end of handle lever 82. A lock nut 91 on bolt 90 serves to adjust the distance, bolt 90 depends from handle lever 82. Rotation of lever 82 in a clockwise direction about bolt 83 in Figure 3 results in cam roller 84 engaging throttle valve 57. Rotation of lever 82 in a counterclockwise direction about bolt 83 in Figure 3 results in bolt 90 depressing adapted plate 63 to close the contacts in switch 61. Valve handle 38 is attached to lever 82.

Thus, movement of handle 38 in the plane of the paper of Figure 3 results in the actuation of throttle valve 57 and switch 61. Rotation of handle 38 in the plane of the paper in Figure 4 results in the actuation of control valves 52 and 54. In this manner, any one of the four control devices can be actuated independently of the others. Furthermore, two of the control devices can be actuated simultaneously. For example, handle lever 82 can be rotated so that cam roller 84 engages throttle valve 57. At the same time, cam lever 74 can be rotated so that either valve 52 or valve 54 is actuated. The importance of this feature will become apparent when the operation of the control system is described in detail.

The overall control system of this invention is illustrated schematically in Figure 5. This system is operated in part pneumatically and in part electrically. Air under pressure is supplied from a storage tank 100 which is connected to an air compressor 101 energized by a motor 102. Motor 102 can comprise a suitable power take-off on the engine of truck 11 or it can be separate therefrom. The outlet port of storage tank 100 is connected to a main air supply line 103 through a filter 104. Gage 28, see Figure 2, is provided to measure the pressure in line 103. An air line 105 extends between line 103 and the inlet port of a solenoid operated valve 106. The outlet port of valve 106 is connected to a pneumatic clutch operator 107. One terminal of the solenoid 106a of valve 106 is grounded and the second terminal is connected through a switch 32 to one terminal of a voltage source 109. The second terminal of voltage source 109 is connected to ground.

An air line 111 communicates between line 103 and the inlet port of a manifold 112. A first outlet port of manifold 112 is connected by an air line 113 to the inlet of control valve 54. The outlet port of control valve 54 is connected by a line 115 to the control port of an air relay 116. An air line 117, having a valve 118 therein, extends between line 115 and the first inlet port of a two-way check valve 119. The outlet port of check valve 119 is connected to the control port of a second air relay 120.

A second outlet port of manifold 112 is connected by an air line 123 to the inlet port of control valve 52. The outlet port of control valve 52 is connected by an air line 124 to the control port of a third air relay 126. An air line 127 communicates between air line 124 and the first inlet port of a three-way check valve 128. The outlet port of check valve 128 is connected by an air line 130 to the control port of an air relay 131. The second inlet ports of check valves 119 and 128 are connected to one another by an air line 133. Line 133 is in turn connected to one port of a solenoid operated valve 134 by an air line 135. The second port of valve 134 is connected by an air line 136 to an air line 137 which in turn is connected to air line 111. One terminal of the solenoid 134a of valve 134 is grounded and the second terminal thereof is connected through switch 61 to the first terminal of voltage source 109.

A third outlet port of manifold 112 is connected by an air line 140 to the inlet port of throttle valve 57. The outlet port of throttle valve 57 is connected to an air line 141 which supplies a throttle cylinder on the engine of truck 11 in the manner described hereinafter. The fourth outlet 142A of manifold 112 is connected to an air line 142, placing line 142A in connection through line 111 with pressure air supply 100. Line 142 is similarly connected through line 105. Depending on closing one valve and opening the other in lines 142 and 142A, either may be connected at 142B to the throttle control mechanism on the engine of truck 11.

An air line 150 extends between air line 111 and the inlet port of a brake control valve 152 which is actuated by lever 39. The outlet port of valve 152 is connected by an air line 153 to the control port of an emergency air relay 154 which has pressure gage 29, see Figure 2, connected thereto. Emergency relay 154 is connected to an emergency reservoir 155 by an air line 156. An air line 157 extends between an outlet port of emergency relay 154 and a first winch brake actuator 158. A branch air line 159 extends between air line 157 and one port of a valve 160. The second port of valve 160 is connected to the first inlet port of a three-way check valve 161 by an air line 162. The outlet port of check valve 161 is connected to a second winch brake actuator 163. Air is supplied to emergency relay 154 through a line 166 which is connected to air line 137.

An air line 167 extends between air line 137 and one port of a solenoid operated valve 168. The second port of valve 168 is connected to the control port of a second emergency air relay by an air line 170. Emergency relay 169 is connected to a second emergency air tank 171 by a line 172. The outlet port of emergency relay 169 is connected to the second inlet port of check valve 161 by an air line 174. Air is supplied to emergency relay 169 by an air line 280 having a solenoid operated three-way valve 175 therein. First terminals of the solenoids 168a and 175a of respective valves 168 and 175 are grounded. The second terminals of these solenoids are connected to the first terminal of voltage source 109 through a switch 31.

Air is supplied to relays 126, 120, 131 and 116 by respective air lines 179, 180, 181 and 182, which communicate with air supply line 111. The outlet port of relay 126 is connected to the energizing side of a low speed clutch actuator 186 by an air line 187, and the outlet port of relay 120 is connected to the deenergizing side of clutch actuator 186 by an air line 188. The outlet port of relay 116 is connected to the energizing side of a high speed clutch 189 by an air line 190, and the outlet port of relay 131 is connected to the deenergizing side of clutch actuator 189 by a line 191.

In Figures 6 and 7, there are illustrated the engine of truck 11 and the winch drum rotated thereby. With reference to Figure 7, there is shown a schematic representation of the engine 200 of truck 11. The speed of this engine is adjusted by a valve in carburetor 201 which is controlled by a throttle cylinder 202. The first port of cylinder 202 is connected to air line 141 and the second port of cylinder 202 is connected to air line 142. The drive shaft 204 of engine 200 contains a clutch 205 which is controlled by clutch actuator 107. Drive shaft 204 is also provided with a gear box 206 which can be actuated either manually or by suitable hydraulic gear shifting mechanism 207.

With reference to Figure 6, the drive shaft 204 of engine 200 is connected to a power take-off device 210 which drives a sprocket 211. A chain 212 extends around sprocket 211 and a sprocket 213 on the winch jackshaft 214. A low speed sprocket 217 is mounted on one end of shaft 214 and a high speed sprocket 216 is mounted on the second end of shaft 214. A first chain 218 extends around sprocket 216 and a sprocket 219 which drives winch drum 12 through a clutch 220. Clutch 220 is controlled by clutch actuator 186. A second chain 222 extends around sprocket 217 and a sprocket 223 which drives winch drum 12 through a clutch 224. Clutch 224 is controlled by clutch actuator 189.

Winch drum 12 is provided with braking mechanism which comprises a pair of brake bands 225 and 226 that are mechanically coupled to one another. These two brake bands are energized simultaneously by either, or both, of brake actuators 158 and 163. This braking mechanism can be of the form shown in my copending application Serial No. 431,816, filed May 24, 1954, for example, wherein the hand operated brake lever is replaced by brake actuators 158 and 163.

The various control elements illustrated in Figure 5 are commercial devices readily available and well understood by those skilled in the art. For this reason, detailed descriptions of the elements are not presented herein. However, in order to understand the operation of the control system, brief reference will be made to the construction and operation of the air relays, the three-way check valves, the emergency relays and the throttle cylinder. Brake valve 152 can be of the form shown on page 81 of Bendix-Westinghouse Automotive Air Brake Co., Elyria, Ohio, Maintenance Manual No. B–W116, for example. Clutch control valves 52, 54 and 57 can be of the form shown on page 12–A–1B of the catalog of November 1950, of said Bendix-Westinghouse Co., for example.

A typical air relay 126 is illustrated in Figure 8. When air is supplied to chamber 240 through line 124, the center of diaphragm 241 is depressed to move the spider diaphragm guide 242 downwardly, thereby opening valve 243. Exhaust valve 244 remains closed at this time. Air is thus supplied from line 179 through chamber 246 to chamber 247 through valve 243. This air is supplied through line 187 to clutch actuator 186, Figure 5. When clutch actuator 186 is exhausted by the application of pressure to the opposite side thereof through line 188, air from the first-mentioned side of the clutch actuator returns through line 187 to chamber 247 and thereby raises diaphragm 241 from its seat adjacent the ports 248 so that the air is exhausted through chamber 249. The other air relays 120, 131 and 116 operate in the same manner. For some operations, the air relay shown on page 138 of the above-mentioned Bendix-Westinghouse manual can be used to advantage.

A typical three-way check valve 128 is illustrated in Figure 9. When air is supplied to the valve through line 133, piston 250 is moved to the illustrated position so that air lines 133 and 130 are in communication. When air is supplied to the valve through line 127, piston 250 is moved so that air lines 127 and 130 are in communication.

A typical emergency air relay 154 is illustrated in Figure 10. Air from line 166 enters chamber 264. The pressure in chamber 264 passes through pressure regulator 271 so that air flows into chamber 267 from chamber 264. In this manner, the air pressure in line 156, which communicates with reservoir 155 is the same as in line 166. Reservoir pressure on the under side of diaphragm 265 normally retains valve 270 closed and valve 262 open. For normal operation, air from line 153 enters chamber 255. This forces the center of diaphragm 256 downwardly to lower the diaphragm guide 257. Diaphragm guide 257 supports diaphragm 256 at its periphery so that the center of the diaphragm can flex downwardly while periphery remains in engagement with seat 258. Depression of guide 257 in this manner opens valve 260 so that air is directed into chamber 261 through valve 262 which is open into line 157, thus actuating the brake chamber. If the air pressure in line 166 should fail, the pressure in chamber 264 drops so that the pressure regulating valve and pressure check valve close. This in turn opens valve 270 and closes valve 262. Under these emergency conditions, air under pressure is supplied from line 156 through chamber 267, through valve 270 and air line 157 to energize brake actuator 158. When it is desired to release the brakes on drum 12 of Figure 6 after emergency application, the remaining air from reservoir 155 and 171 can be drained or the emergency line reconnected, which again places air pressure under the emergency diaphragm 265, pushing it up and opening the upper emergency valve 262, which allows air pressure in the brake chambers to escape through the exhaust port. For some operations, the emergency air relay, shown on page 151 of the above-mentioned Bendix-Westinghouse manual, can be used to advantage.

Figure 11:
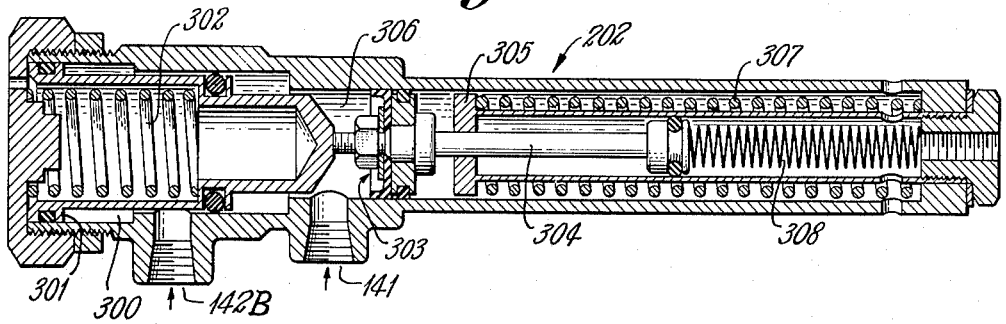
Figure 11 is a longitudinal central cross-sectional view through the throttle cylinder of the truck engine.

Throttle cylinder 202 is illustrated in Figure 11. The chamber 300 adjacent piston 301 is supplied with air under tank pressure by line 142B. This retains piston 301 in the position shown with spring 302 compressed. When air is supplied to line 141 through throttle valve 57, Figure 5, a force is applied to piston 303 which balances the force applied to piston 301 so that plunger 304 is moved to the right to engage cylinder 305 by the combined forces of spring 302 and the air pressure in chamber 306. Cylinder 305 is moved against the forces of springs 307 and 308 by an amount proportional to the air pressure in chamber 306. Cylinder 305 is connected to the valve in carburetor 201 of engine 200.

The operation of the control system of this invention will now be described in detail. Ignition switch 32 is turned to the first position "A" to energize the ignition coil (not shown) of a conventional internal combustion engine ignition system (not shown) and all other electrical switches except 31 (which is always energized due to its direct connection to the voltage source 109). Switch 36 is closed to energize solenoid 106a. This applies air pressure to clutch actuator 107 so that the clutch 205 of the truck is disengaged. The switch 32 is now turned on additional amount to a second position "B" to energize a starter solenoid (not shown) of a conventional internal combustion engine electrical motor starter system (not shown) and start the engine. Upon starting, the ignition switch automatically returns to the first position, due to the biasing action of a spring (not shown). It will be seen that switch 32 is merely a conventional automobile combined ignition and starter switch, already in use on many popular automobiles before the filing date of the present application, the particular switch used being the Delco Remy No. 1116501, although any switch of this general type can obviously be substituted. Because switch 32 is conventional further description is believed unnecessary. As there is a continuous arcuate contact electrode to contact switch blade 32 from "A" to "B" the ignition remains on before, during, and after starter actuation. The desired gear is selected and switch 36 is opened to allow the truck clutch to return to the engaged position. Power is then delivered to take-off 210, Figure 6. If a heavy load is to be hoisted by winch drum 12, the low speed clutch actuator 189 is energized to supply power to drum 12 through sprocket 217 and chain 222. This is accomplished by moving handle 38 to open control valve 54 to supply air pressure to relay 116 through line 115. Air pressure is thereby applied to clutch actuator 189 through line 190. At the same time, pressure is delivered to air relay 120 through lines 117, valve 118, check valve 119 to relay 120. This applies air pressure to clutch actuator 186 through line 188 to disengage the high speed clutch. The speed at which drum 12 is rotated is controlled by throttle valve 57 which is then engaged by handle 38. Clutch actuators 186 and 189 remain in the described positions until air pressure is supplied to the opposite sides of actuator 189, both clutches then being free. If it is desired to increase the engine speed at the same time, clutch actuator 189 is energized. Handle 38 can be positioned so that both clutch control valve 54 and throttle valve 57 are engaged simultaneously.

If it is desired to drive winch drum 12 at a higher speed, handle 38 moves to engage control valve 52. This applies air pressure to the control parts of air relays 126 and 131 so that clutch actuator 186 is energized through line 188 and clutch actuator 189 is deenergized through line 190. If valve 118 is closed, it is possible to energize both clutch actuators at the same time to supply a larger torque to the winch drum. With the low speed clutch actuator 189 energized, control valve 52 can be operated to energize the high speed clutch actuator 186 momentarily without operating air relay 131 to disengage clutch actuator 189. When it is desired to deenergize both clutch actuators, handle 38 is moved to close electrical switch 61. This energizes solenoid 134a so that air pressure is applied through lines 137 and 136, valve 134, line 135, line 133, check valve 128 and line 130 to air relay 131. Air is also applied through check valve 119 to air relay 120. Both clutch actuators are thereby deenergized by air pressure being applied through respective lines 188 and 191.

The winch drum braking system operates in the manner previously described in conjunction with emergency relay 154. When it is desired to apply the brakes, valve 152 is opened to apply air to emergency relay 154. This in turn applies air through line 157 to brake actuator 158. If valve 160 is open, air is also applied through lines 159 and 162 to brake actuator 163. If the air supply line 166 should fail for any reason, the brake actuators are energized from emergency tank 155 in the manner previously described.

A second emergency brake system is provided by emergency relay 169 and its associated storage tank 171. This system is actuated by closing switch 31, which energizes solenoids 168a and 175a. Three-way valve 168 normally is closed while three-way valve 175 normally is open so that line 173 is in communication with line 280 which enters emergency relay 169. When solenoid 175a is energized, valve 175 is closed so that line 280 communicates with a vent line 281. When valve 168 is opened, air pressure is applied to emergency relay 169 through line 170 to energize brake actuator 163 through line 174. If solenoid valve 168 should fail for any reason, brake actuator 163 is energized from the air pressure in emergency tank 171. Furthermore, if solenoid valve 175 should fail for any reason, brake actuator 163 is energized by emergency air relay 169 being energized from line 170. Thus, brake actuator 163 is energized if either or both of the solenoid valves 168 or 175 operates.

Figure 12:
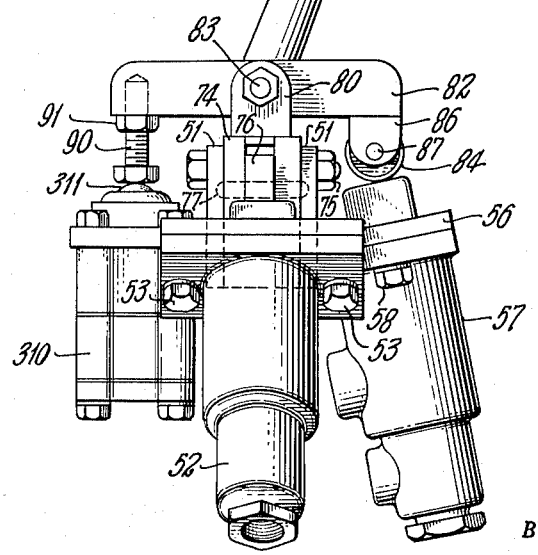
Figure 12 is a view of a modified form of the clutch and throttle control system.

In Figure 12, there is shown a modified form of the clutch actuator control system. The switch control indicated in Figure 12 is generally similar to Figure 3 and corresponding elements are designated by like reference numerals. Electrical switch 61, however, is replaced by an air valve 310 which can be in the form of a poppet valve, for example. Valve 310 is operated by bolt 90 in a manner such that rotation of handle 38 in a counterclockwise direction about bolt 83 results in bolt 90 depressing the upper end 311 of valve 310 to open the valve. Valve 310 replaces solenoid valve 134 of Figure 5. In this manner, valve 310 directly controls the application of air to relays 120 and 131 to deenergize clutch actuators 186 and 189. This arrangement enables the clutch actuation system to be operated entirely with pneumatic equipment.

In view of the foregoing description of preferred embodiments of this invention, it should be apparent that there is provided an improved control system for a well servicing unit. The operator has at a single position all of the controls necessary to effect the full operation of the well servicing, drilling or workover unit. The control box 25 can be positioned at any location desired by the operator with regard to his own personal convenience. This arrangement enables the operator to control a well servicing operation with a minimum of physical fatigue and thereby with a maximum efficiency. This control system also incorporates a large number of safety devices in the braking system. If the main control mechanism should fail for any reason, a plurality of auxiliary emergency brake operating devices is available. The novel valve control mechanism of this invention enables a plurality of control devices to be actuated by means of a single lever. Furthermore, a pair of these control devices can be actuated simultaneously by the single lever. While the invention has been described in conjunction with present preferred embodiments thereof, it should be apparent that the invention is not limited thereto.

What is claimed is:

1. In a well servicing unit including a winch drum, an engine, and transmission means including a high speed clutch and a low speed clutch for driving said drum from said engine; a control system comprising, in combination, a source of pneumatic pressure, first pneumatically operated means to engage said high speed clutch, second pneumatically operated means to disengage said high speed clutch, third pneumatically operated means to engage said low speed clutch, fourth pneumatically operated means to disengage said low speed clutch, first valved means to supply pressure from said source to said first and fourth pneumatically operated means, second valved means to supply pressure from said source to said second and third pneumatically operated means, third valved means to supply pressure from said source to said second and fourth pneumatically operated means, pneumatically operated means to regulate the speed of said engine, and fourth valved means to regulate the pressure supplied to said last-mentioned pneumatically operated means thereby to regulate the speed of said engine.

2. The combination in accordance with claim 1 wherein said first, second, third and fourth valved means are actuated by a single handle which is pivoted on a support to engage said valved means selectively.

3. The combination in accordance with claim 2 wherein said first, second and fourth valved means include pneumatic valves actuated by said handle; and said third valved means includes an electrically operated pneumatic valve, and a switch to operate said electrically operated pneumatic valve, said switch being actuated by said handle.

4. The combination in accordance with claim 2 wherein all of said valved means include pneumatic valves actuated by said handle.

5. The combination in accordance with claim 1 wherein said first, second, third and fourth valved means include a support, first, second, third and fourth valves secured to said support in spaced relation, a first lever pivotally secured to said support whereby rotation of said first lever results in said first and second valves being actuated, a second lever pivotally secured to said first lever whereby rotation of said second lever results in said third and fourth valves being actuated, the planes of rotation of said first and second levers being at approximately right angles to one another, and a handle secured to said second lever to rotate said first and second levers whereby said first, second, third and fourth valves can be actuated individually and adjacent pairs of said valves can be actuated simultaneously.

6. The combination in accordance with claim 1 wherein said first, second, third and fourth valved means include a support, a first lever pivotally mounted near its mid-point on said support, a second lever pivotally mounted nears its mid-point on said first lever at a point near the mid-point of said first lever, a handle attached to said second lever to rotate said first and second levers, the planes of rotation of said first and second levers about their respective pivot points being at approximately right angles to one another, a first valve mounted on said support to be engaged by one end of said first lever, a second valve mounted on said support to be engaged by the second end of said first lever, a third valve mounted on said support to be engaged by one end of said second lever, and a fourth valve mounted on said support to be engaged by the second end of said second lever.

7. Valve control apparatus comprising, in combination, a support, a first lever pivotally mounted near its mid-point on said support, a second lever pivotally mounted near its mid-point on said first lever at a point near the mid-point of said first lever, a handle attached to said second lever to rotate said first and second levers, the planes of rotation of said first and second levers about their respective pivot points being at approximately right angles to one another, a first valve mounted on said support to be engaged by one end of said first lever, a second valve mounted on said support to be engaged by the second end of said first lever, a third valve mounted on said support to be engaged by one end of said second lever, and a fourth valve mounted on said support to be engaged by the second end of said second lever.

8. Valve control apparatus comprising, in combination, a support, first, second, third and fourth valves secured to said support in spaced relation, a first lever pivotally secured to said support whereby rotation of said first lever results in said first and second valves being actuated, a second lever pivotally secured to said first lever whereby rotation of said second lever results in said third and fourth valves being actuated, the planes of rotation of said first and second levers being at approximately right angles to one another, and a handle secured to said second lever to rotate said first and second levers whereby said first, second, third and fourth valves can be actuated individually and adjacent pairs of said valves can be actuated simultaneously.

9. In a well servicing unit including a winch drum, an engine, and transmission means including a high speed clutch and a low speed clutch for driving said drum from said engine; a control system comprising, in combination, a source of pneumatic pressure, a first pneumatically operated clutch actuator with first and second inlet ports, said first clutch actuator being connected to said high speed clutch whereby application of pneumatic pressure to said first port engages said high speed clutch and application of pneumatic pressure to said second port disengages said high speed clutch, a second pneumatically operated clutch actuator with third and fourth inlet ports, said second clutch actuator being connected to said low speed clutch whereby application of pneumatic pressure to said third port engages said low speed clutch and application of pneumatic pressure to said fourth port disengages said low speed clutch, first valved means to supply pressure from said source to said first and fourth ports, second valved means to supply pressure from said source to said second and third ports, third valved means to supply pressure from said source to said second and fourth ports, pneumatically operated means to regulate the speed of said engine, and fourth valved means to regulate the pressure supplied to said last-mentioned pneumatically operated means thereby to regulate the speed of said engine.

10. In a well servicing unit including a winch drum, an engine, and transmission means including a high speed clutch and a low speed clutch for driving said drum from said engine; a control system comprising, in combination, a source of pneumatic pressure, a first pneumatically operated clutch actuator with first and second inlet ports, said first clutch actuator being connected to said high speed clutch whereby application of pneumatic pressure to said first port engages said high speed clutch and application of pneumatic pressure to said second port disengages said high speed clutch, a second pneumatically operated clutch actuator with third and fourth inlet ports, said second clutch actuator being connected to said low speed clutch whereby application of pneumatic pressure to said third port engages said low speed clutch and application of pneumatic pressure to said fourth port disengages said low speed clutch, first, second, third and fourth pneumatic relays, said source of pressure being supplied to each of said relays, the outlet ports of said first, second, third and fourth relays being connected to said first, second, third and fourth ports, respectively, first valved means to supply pressure from said source to the control ports of said first and fourth relays, second valved means to supply pressure from said source to the control ports of said second and third relays, third valved means to supply pressure from said source to the control ports of said second and fourth relays, pneumatically operated means to regulate the speed of said engine, and fourth valved means to regulate the pressure supplied to said last-mentioned pneumatically operated means thereby to regulate the speed of said engine.

11. The combination in accordance with claim 10 wherein said first, second, third and fourth valved means are actuated by a single handle which is pivoted on a support to engage said valved means selectively.

12. The combination in accordance with claim 10 wherein said first, second, third and fourth valved means include a support, first, second, third and fourth valves secured to said support in spaced relation, a first lever pivotally secured to said support whereby rotation of said first lever results in said first and second valves being actuated, a second lever pivotally secured to said first lever whereby rotation of said second lever results in said third and fourth valves being actuated, the planes of rotation of said first and second levers being at approximately right angles to one another, and a handle secured to said second lever to rotate said first and second levers whereby said first, second, third and fourth valves can be actuated individually and adjacent pairs of said valves can be actuated simultaneously.

References Cited in the file of this patent

UNITED STATES PATENTS

| | | |
|---|---|---|
| 2,329,742 | Bush et al. | Sept. 21, 1943 |
| 2,422,596 | Stevens | June 17, 1947 |
| 2,426,064 | Stevens | Aug. 19, 1947 |
| 2,505,260 | Stevens | Apr. 25, 1950 |